(12) United States Patent  (10) Patent No.: US 7,654,549 B2
Hutson  (45) Date of Patent: Feb. 2, 2010

(54) SEMI-RECUMBENT BICYCLE

(75) Inventor: Kelly Hutson, Logan, IA (US)

(73) Assignee: Day 6 Bicycles, LLC, Bozeman, MT (US)

( * ) Notice: Subject to any disclaimer, the term of this patent is extended or adjusted under 35 U.S.C. 154(b) by 235 days.

(21) Appl. No.: 11/809,975

(22) Filed: Jun. 4, 2007

(65) Prior Publication Data

US 2008/0296864 A1  Dec. 4, 2008

(51) Int. Cl.
*B62K 3/02* (2006.01)
*B62K 19/36* (2006.01)

(52) U.S. Cl. .................... 280/288.1; 280/284; 280/282; 280/281.1; 280/220; 280/226.1; 280/274

(58) Field of Classification Search .............. 280/288.1, 280/284, 282, 281.1, 220, 226.1, 274
See application file for complete search history.

(56) References Cited

U.S. PATENT DOCUMENTS

| | | | | |
|---|---|---|---|---|
| 4,925,203 A | * | 5/1990 | Buckler | 280/278 |
| 5,201,538 A | * | 4/1993 | Mayn | 280/288.1 |
| 5,269,550 A | * | 12/1993 | Hon et al. | 280/278 |
| 5,509,678 A | * | 4/1996 | Ullman et al. | 280/281.1 |
| 5,853,062 A | * | 12/1998 | Hulett | 180/206 |
| 5,951,034 A | * | 9/1999 | Mayo | 280/288.1 |
| 6,497,426 B2 | * | 12/2002 | VanPelt | 280/287 |
| 6,527,291 B1 | * | 3/2003 | Hurtig | 280/288.1 |
| 6,695,335 B1 | * | 2/2004 | Gaastra | 280/288.1 |
| 6,845,997 B2 | * | 1/2005 | Chou | 280/278 |
| 7,048,290 B2 | * | 5/2006 | Paquette | 280/252 |

* cited by examiner

*Primary Examiner*—Lesley Morris
*Assistant Examiner*—Marlon A Arce
(74) *Attorney, Agent, or Firm*—Joseph S. Heino; Patrick M. Bergin

(57) ABSTRACT

An improved semi-recumbent bicycle seat includes a frame having a main seat support tube and a steering mechanism including a front tire support fork. Front and rear wheels are mounted on the front tire support fork and on the frame. A bicycle seat is mounted above and forwards of the rear wheel, the bicycle seat including a bicycle seat frame, a seat base and a seat cushion. A seat back is adjustably mounted on the bicycle seat frame for adjustment of the height and spacing of the seat back relative to the seat base, and the seat cushion includes a generally flat planar front face and a forwardly tilted top surface which is tilted from horizontal between two and thirty degrees (2° and 30°). The bicycle seat frame is adjustably mounted on the main seat support tube free of any other support connection to the bicycle frame.

11 Claims, 4 Drawing Sheets

SEMI-RECUMBENT BICYCLE

CROSS-REFERENCE TO RELATED PATENT

This application claims priority based on a non-provisional patent, specifically on the non-provisional patent application Ser. No. 11/111,418 filed Apr. 21, 2005.

BACKGROUND OF THE INVENTION

1. Technical Field

The present invention relates generally to bicycles and, more particularly, to an improved semi-recumbent bicycle which includes a frame having a main seat support tube, a steering mechanism rotatably mounted on the frame including a front tire support fork, front and rear wheels, pedals for powered rotation of one of the wheels, a bicycle seat mounted above and forwards of the rear wheel which includes a bicycle seat frame, a seat base with a seat cushion, a seat back adjustably mounted on the bicycle seat frame for adjustment of the height of the generally upright seat back relative to the seat base and the distance the generally upright seat back is spaced from the seat base, the seat cushion including a generally flat planar front face and a forwardly tilted top surface such that said front face is positioned lower than the rear portion of the seat cushion and the top surface is forwardly tilted from horizontal between two and thirty degrees (2° and 30°), and the front face of the seat cushion is positioned above and rearwards of the pedals and the bicycle seat frame is adjustably mounted on the main seat support tube free of any other support connection to the bicycle frame thereby providing a selectable comfort level for the user of the bicycle of the present invention.

2. Description of the Prior Art

Many different types of bicycles are currently used by bicycling enthusiasts, including standard upright-type bicycles, recumbents and tricycles, to name but a few of the different types of cycles currently available. Traditional, upright-type bicycles have pedals which are almost directly below the rider which cause the legs to move in an up and down motion. Because of this up and down motion, the seats on all traditional bicycles must be narrow enough to allow the legs to move freely during the pedaling motion. This required the use of what is now known as the "pommel" seat, which is used with virtually every traditional bicycle manufactured today. The height of the seat is adjustable to give the rider the proper distance to the pedals.

Regarding the recumbent bicycle, these have pedals positioned in front of the seat which cause the rider to pedal in forward and backward motion instead of the up and down motion of the traditional bicycle. Because of this pedal motion, the recumbent bicycle may be fitted with a seat which is wide and generally flat to support the buttocks of the rider of the recumbent bicycle. The horizontal positioning of the seat is adjustable to give the rider the proper distance to the pedals. Each of these bicycles has inherent advantages and defects in their design and use, but so long as they are used for their intended purpose, they will generally provide a safe and enjoyable exercise and travel vehicle. While it is generally true that upright bicycles are more popular than recumbent bicycles, it should be noted that one of the significant advantages enjoyed by the recumbent bicycles is that they are far more comfortable to sit on due to the support characteristics of the seat on the bicycle. Specifically, the vast majority of recumbent bicycles include a seat having a seat base and a seat back which allows the rider of the bicycle to recline during operation of the bicycle and thus increase the comfort level of the individual using the bicycle.

One type of bicycle that has been developed to incorporate superior elements of both traditional and recumbent bicycles is the semi-recumbent bicycle, in which the pedal position is somewhere between the positioning of the traditional and the recumbent. This means that the legs of the user of the semi-recumbent bicycle extend forwards and downwards, and this means that the seat on the semi-recumbent bicycle generally is of the type found on traditional bicycles, i.e. the pommel type of seat. The few that attempt to incorporate wider seats still must use a pommel in the front to permit the proper leg movement for pedaling. However, there is a distinct need for a wide, generally flat seat which can be used on a semi-recumbent bicycle for increased comfort yet which will not interfere with the operation of the pedals of the semi-recumbent bicycle.

One of the key features affecting the comfort level found in seats having seat bases and seat backs is whether the seat is generally flat or whether the seat is of the more traditional pommel-type style of seat as is generally necessary for use in connection with bicycles which are not recumbents. A bicycle seat of the pommel-type style will not provide a significant increase in the comfort level of the user of the bicycle even if it includes a back, as the design of the pommel-type style of bicycle seat does not encourage a user to recline on the bicycle seat to engage the seat back. The positioning of the handlebars on traditional bicycles also prevents the user from being able to lean back because one must lean forward to grasp the handlebars.

However, when the bicycle seat is of the larger, flat variety, it is very difficult if not impossible to use the seat with upright or semi-recumbent bicycles because it interferes with the pedaling motion of these bicycles. In fact, the large, flat types of seats, until now, have only been used on recumbents. There is therefore a need for a modified bicycle seat, including a seat back, which includes a flat front surface which may be used in connection with more upright bicycles which combine the best elements of upright bicycles and recumbents without greatly sacrificing the comfort and performance characteristics of either, namely, semi-recumbents.

Therefore, an object of the present invention is to provide an improved semi-recumbent bicycle.

Another object of the present invention is to provide an improved semi-recumbent bicycle which includes a seat having a seat back which is movable with and adjusts with the seat base as the seat base height is adjusted, yet may also be adjusted independently to provide proper support for the individual's back who is using the bicycle.

Another object of the present invention is to provide an improved semi-recumbent bicycle in which the seat, specifically the seat cushion, includes a generally flat front surface to provide maximum support for the legs of the user, yet which will permit the user to pedal the bicycle as he or she desires.

Another object of the present invention is to provide an improved semi-recumbent bicycle in which the angle between the rotational axis of the pedals and the front face of the seat is between forty and fifty-five degrees (40° and 55°).

Another object of the present invention is to provide an improved semi-recumbent bicycle in which the seat includes a forwardly tilted top surface to permit the user of the bicycle seat to pedal the bicycle while also being able to recline on the seat to support his or her back on the seat back.

Finally, another object of the present invention is to provide an improved semi-recumbent bicycle which is relatively simple and durable in construction and is safe and comfortable in use.

SUMMARY OF THE INVENTION

The present invention provides an improved semi-recumbent bicycle which includes a frame having a main seat support tube and a steering mechanism rotatably mounted on the frame including a front tire support fork. Front and rear wheels are respectively rotatably mounted on the front tire support fork and on the frame, and pedals having a pedal axle rotatably mounted on the frame are operatively connected to at least one of the front and rear wheels for powered rotation thereof. A bicycle seat is mounted above and forwards of the rear wheel, the bicycle seat including a bicycle seat frame and a seat base mounted on the bicycle seat frame and having a seat cushion mounted thereon. A seat back is adjustably mounted on the bicycle seat frame for adjustment of the height of the generally upright seat back relative to the seat base and the distance the generally upright seat back is spaced from the seat base. The seat cushion includes a generally flat planar front face and a forwardly tilted top surface such that the front face is positioned lower than the rear portion of the seat cushion, with that top surface being forwardly tilted from horizontal between two and thirty degrees (2° and 30°). The front face of the seat cushion is positioned above and rearwards of the pedal axle of the pedal means, and finally, the bicycle seat frame is adjustably mounted on the main seat support tube free of any other support connection to the bicycle frame.

The present invention as thus described provides many advantages over those bicycles found in the prior art. For example, because the semi-recumbent bicycle of the present invention provides a seat which includes both a seat base and a seat back, it is far more comfortable for users than those seats which do not include seat backs, which, to the inventor's knowledge, is every currently manufactured semi-recumbent bicycle. Also, because the bicycle seat of the present invention is height-adjustable as a single unit, quick and simple adjustment of the entire seat assembly is permitted, as opposed to those seats found in the prior art. Furthermore, as the improved semi-recumbent bicycle of the present invention includes the seat having a forwardly tilted seat base, the rider may comfortably and safely use the semi-recumbent bicycle, therefore allowing the rider to use a type of bicycle which has been found to be one of the most comfortable and efficient types of bicycles currently being produced. The increased comfort level available through use of the improved semi-recumbent bicycle of the present invention is expected to encourage additional use of the bicycle, and thus the user will reap increased benefits from riding the bicycle. Finally, the improved semi-recumbent bicycle of the present invention is relatively simple to construct and manufacture, yet is durable and comfortable in use. It is therefore seen that the present invention provides a substantial improvement over those bicycles found in the prior art.

DESCRIPTION OF THE PREFERRED EMBODIMENT

Figure 1:
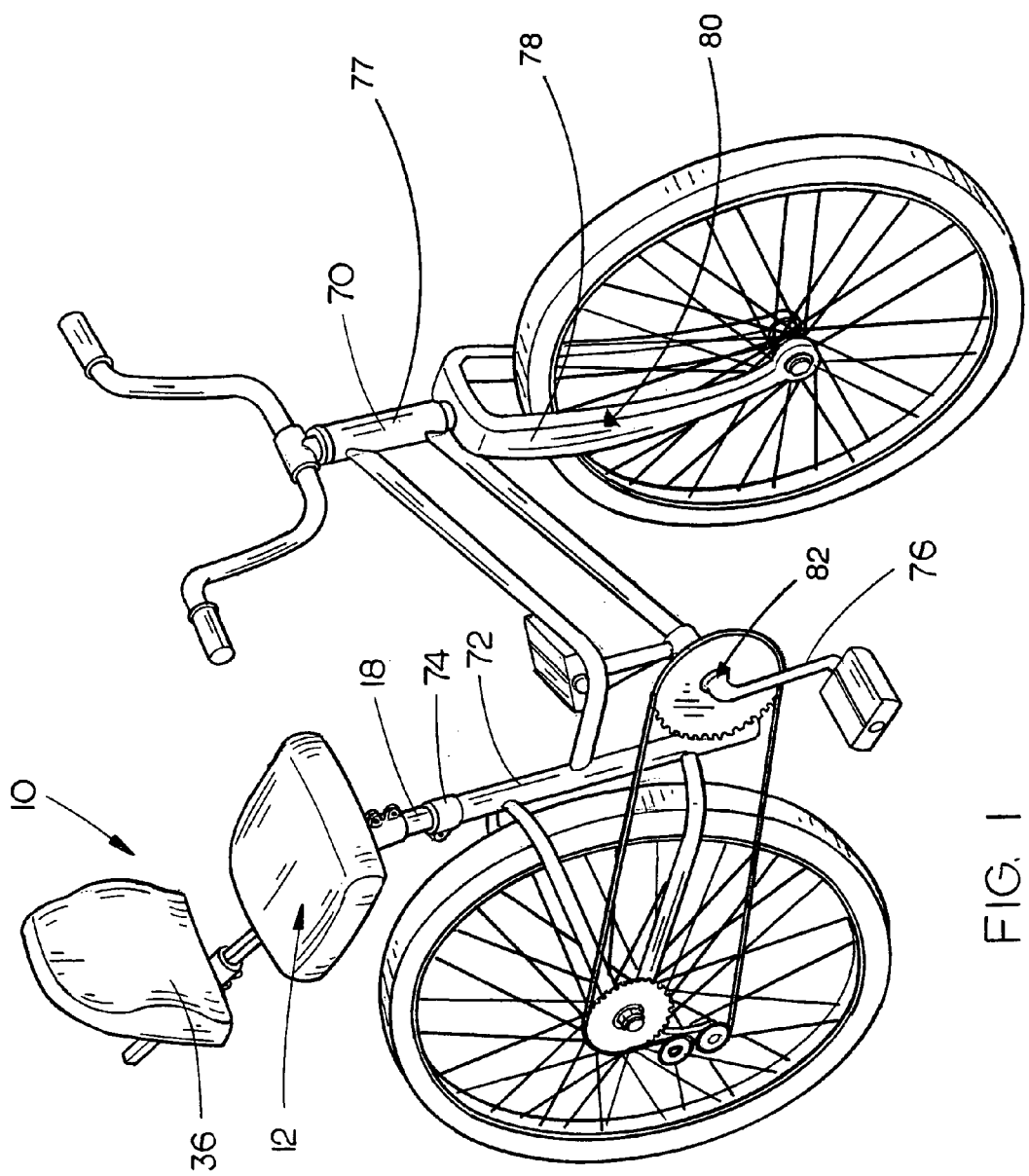
FIG. 1 is a perspective view of the improved semi-recumbent bicycle of the present invention.
Figure 2:
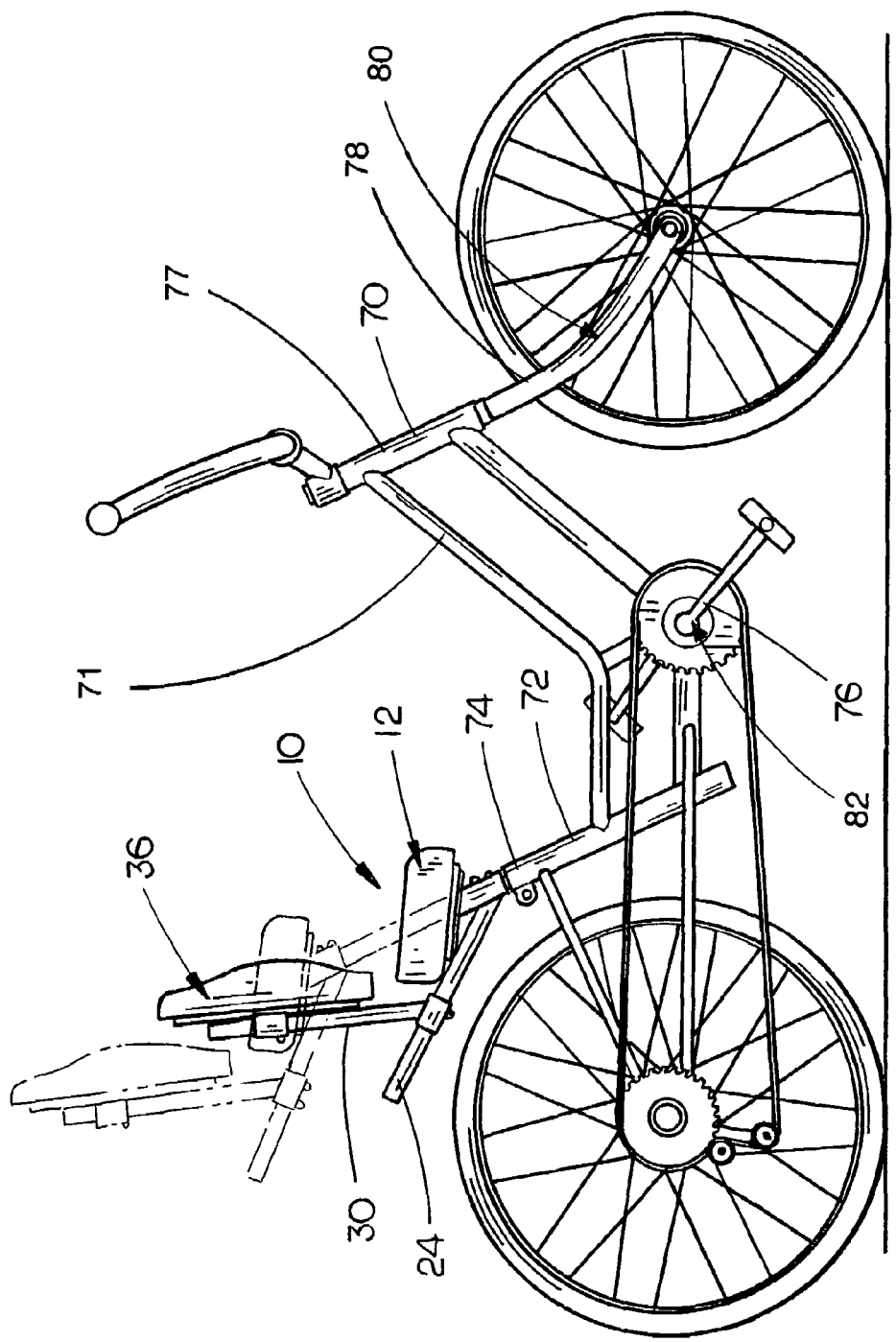
FIG. 2 is a side elevational view of the improved semi-recumbent bicycle of the present invention.
Figure 3:
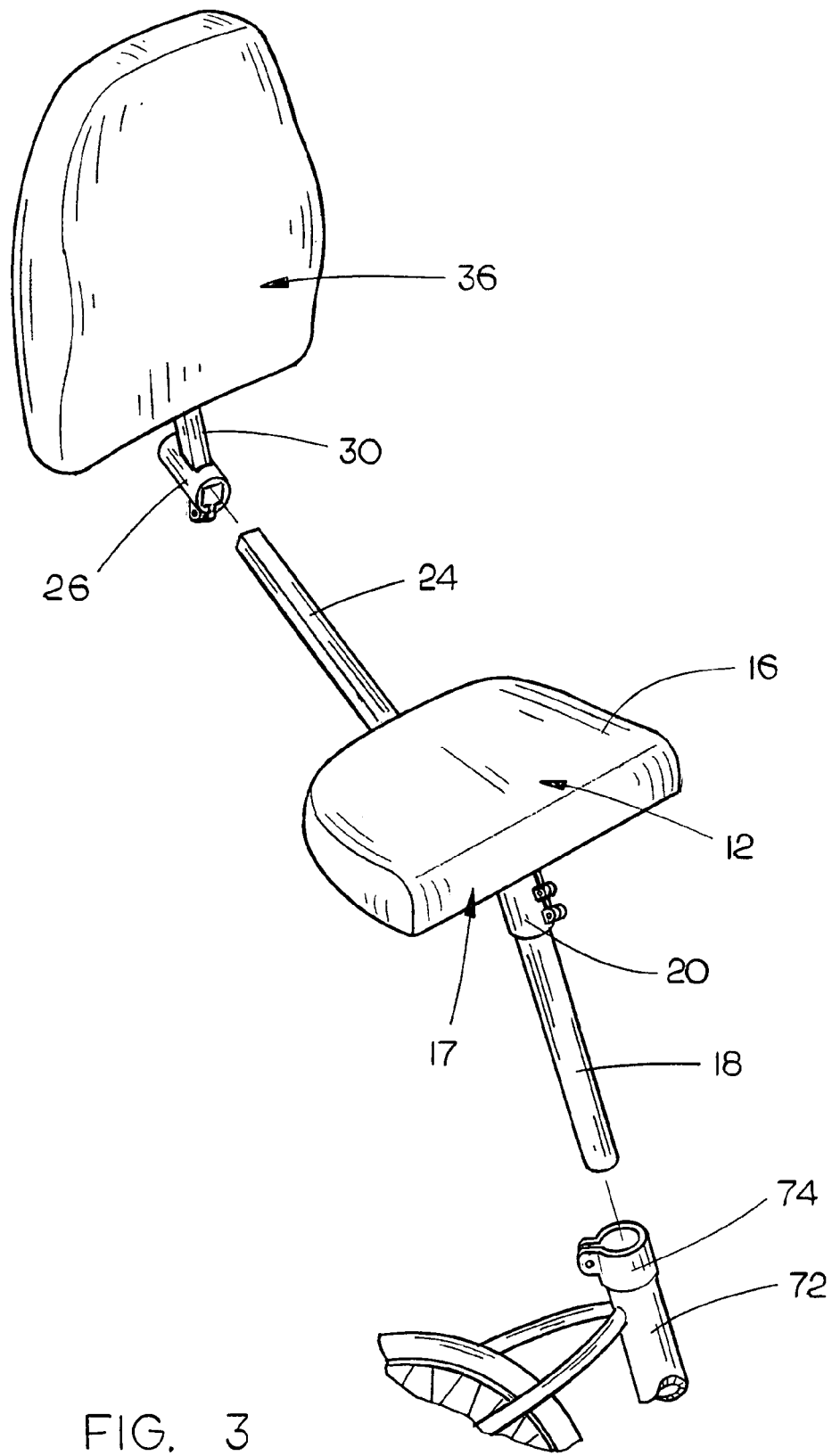
FIG. 3 is a detail perspective view of the bicycle seat used with the present invention.

The improved semi-recumbent bicycle 70 of the present invention is shown best in FIGS. 1 and 2 as including a frame 71 on which is mounted a main seat support tube 72

The improved bicycle seat 10 of the present invention is shown best in FIGS. 1-4 as including a seat base 12 which includes a generally flat base plate 14 on top of which is mounted a seat cushion 16. In the preferred embodiment, seat cushion 16 would have a width of approximately ten to eighteen inches, a height of approximately one-half inch to four inches, and a depth of approximately six to twelve inches, depending on the comfort level desired by the user of the present invention and the dimensions of the individual using the seat. Seat cushion 16 is preferably secured to base plate 14 by a plurality of screws or the like, although the exact nature of the securement device used to connect base plate 14 to seat cushion 16 is not critical to the present invention so long as the seat cushion 16 is securely and safely mounted on the base plate 14.

Figure 4:
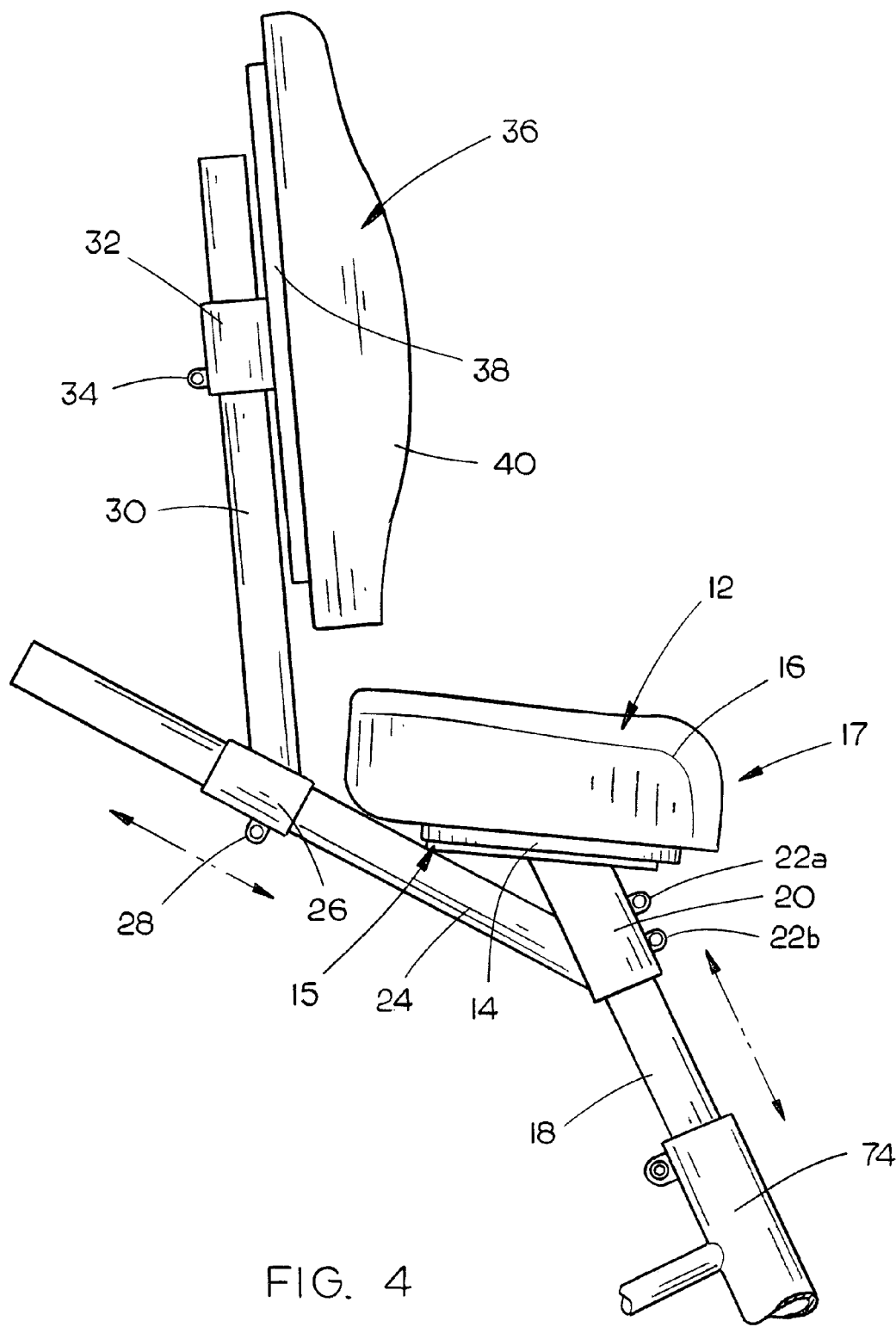
FIG. 4 is a detail side elevational view of the bicycle seat of the bicycle of the present invention showing the adjustable elements thereof.

Mounted on and extending downwards from the underside of base plate 14 is a seat base mounting shaft 18 which, in the preferred embodiment, would be a hollow metal or composite tube which extends downwards from base plate 14 at an angle of approximately ten to thirty-five degrees (10° to 35°) from vertical, as shown best in FIGS. 2 and 4. Seat base mounting shaft 18 would preferably have a length of approximately twelve to twenty-four inches, depending on the length of the shaft needed to securely and safely mount the seat base mounting shaft 18 on the bicycle 70 on which the bicycle seat 10 is to be mounted.

The actual mounting connection of seat base mounting shaft 18 to base plate 14 is via seat base mounting collar 20 which is preferably welded to the underside of base plate 14, as shown best in FIG. 4, and would include a pair of clamping bolts 22a and 22b which releasably secure the seat base mounting shaft 18 within the seat base mounting collar 20. In the preferred embodiment, the seat base mounting collar 20 would be constructed as a hollow tube of metal or composite material having a narrow section of the wall removed therefrom. The pair of clamping bolts 22a and 22b would be mounted on the wall of the seat base mounting collar 20 and when the pair of clamping bolts 22a and 22b are tightened, the internal diameter of the seat base mounting collar 20 is reduced thus constricting the seat base mounting collar 20 and clamping the seat base mounting shaft 18 within the seat base mounting collar 20.

Mounted on and extending rearwards from the seat base mounting collar 20 is a seat back mounting shaft assembly which includes a seat back mounting shaft 24 which extends upwards and rearwards from the seat base mounting collar 20 at an angle of approximately fifteen to forty degrees (15° to 40°) from horizontal, as shown best in FIGS. 2 and 4. In the preferred embodiment, the seat back mounting shaft 24 would preferably be of similar dimensions to that used in connection with seat base mounting shaft 18, although it may be preferable to form seat back mounting shaft 24 out of smaller diameter or thinner wall thickness tubing as the weight which seat back mounting shaft 24 must support is substantially less than the weight supported by seat base mounting shaft 18. An important feature of the seat back mounting shaft 24, however, is that in the preferred embodiment the seat back mounting shaft is connected not only to the seat base mounting collar 20 but also to the rear portion 15 of the base plate 14, as shown in FIG. 4. This creates a triangle defined by the seat back mounting shaft 24, the seat base mounting collar 20 and the base plate 14 which significantly increases the structural strength of the seat back mounting shaft 24 and thus reduces the possibility of structural failure of the connection between the seat back mounting shaft 24 and the seat base mounting collar 20.

Slidably mounted on seat back mounting shaft 24 is seat back support mounting collar 26 which, in the preferred embodiment, would be a mounting collar similar to that described in connection with seat base mounting collar 20, but would preferably include only a single clamp bolt 28, as the angle of seat back support mounting collar relative to the seat back mounting shaft 24 means that when rearward pressure is applied to the seat back support mounting collar 26, it frictionally binds on seat back mounting shaft 24 to generally prevent movement of the seat back support mounting collar 26 thereon until the force being applied to the seat back support mounting collar 26 is applied generally parallel to the seat back mounting shaft 24. Although this feature is not critical to the present invention, it does mean that the seat back support mounting collar 26 is sufficiently secure for use when including only a single clamp bolt 28.

Mounted on and extending upwards from the seat back support mounting collar 26 is a seat back support shaft 30 which, in the preferred embodiment, would have dimensions of approximately ten to 18 inches (10" to 18") in length and would have a diameter of approximately one-half to three inches (½"to 3"), although this is not critical to the functionality of the present invention so long as the seat back support shaft 30 has sufficient strength to support the seat back 36 thereon. To mount the seat back 36 on seat back support shaft 30, a seat back mounting collar 32 is mounted on the backside of seat back 36 which slidably engages the seat back support shaft 30, as shown best in FIGS. 3 and 4. The seat back mounting collar 32 would be releasably secured in place on the seat back support shaft 30 by a single clamp bolts 34 which clamps the seat back mounting collar 32 in the desired location on seat back support shaft 30. Of course, it should be noted that modifications of the various mounting collars and shafts described herein are contemplated as being a part of this disclosure, as it may be desirable to substitute another type of shaft engagement device for the mounting collars described herein, and such modifications and substitutions would be understood by one skilled in the art of metal manufacture and assembly.

Seat back 36 preferably would include a seat back base plate 38 and a seat back cushion 40 mounted on the seat back base plate 38, as shown best in FIG. 4. The seat back cushion 40 may be of any appropriate size and shape, but it has been found that a generally rectangular seat back shape is ideal for use with the bicycle seat 10 of the present invention and provides a high degree of back support for the individual using the bicycle seat 10 of the present invention. It is therefore expected that the seat back cushion 40 would have dimensions of approximately twelve to eighteen inches in height, ten to eighteen inches in width, and have a thickness of approximately one-half inch to four inches, depending on the amount of cushion needed to properly support the back of the user of the bicycle seat 10 of the present invention.

The bicycle seat 10 of the present invention would be installed on a semi-recumbent bicycle 70, as shown best in FIG. 2, wherein the seat base mounting shaft 18 would be slidably housed within the main seat support tube 72 of the bicycle 70 and would be height-adjustably mounted therewithin by use of a seat base mounting shaft engagement collar 74 which is adapted to releasably secure the seat base mounting shaft 18 within main seat support tube 72. Once the height of the seat base 12 has been set via the seat base mounting shaft collar 74 on main seat support tube 72, the height and positioning of the seat back 36 relative to seat base 12 may be adjusted by adjustment of the seat back support mounting collar 26 and seat back mounting collar 32, which permit the sliding of the collars on the seat back mounting shaft 24 and seat back support shaft 30 respectively, as shown best in FIGS. 3 and 4. This is one of the key features of the bicycle seat 10 of the present invention, in that the comfort level obtainable by adjustment of the seat back 36 relative to seat base 12 may be maximized for each and every user of the bicycle seat 10 of the present invention. Such flexibility in fitting is unheard of in the bicycle seats found in the prior art and thus represents a substantial improvement over those devices found in the prior art.

Another critical feature of the present invention involves the front face 17 of seat cushion 16. As shown best in FIGS. 3 and 4, the front face 17 of seat cushion 16 is generally flat and extends generally perpendicular to the direction of forward motion of the bicycle 70. In the past, it was very difficult for a bicycle seat to include a generally flat front face such as the one shown in the present invention as the generally flat front face 17 of seat cushion 16 would likely interfere with the pedaling of the bicycle 70, unless the bicycle were of the recumbent type. As can be seen in FIGS. 1 and 2, however, the bicycle 70 shown in those figures is of the semi-recumbent type and thus the pedals 76 are positioned substantially forward and substantially below the vertical height of the seat base 12. In order to permit proper use of the bicycle seat 10 of the present invention in connection with the semi-recumbent bicycle 70 as shown in FIGS. 1 and 2, it is necessary to tilt the seat base 12 forwards relative to horizontal, as shown best in FIG. 2. The tilt of seat base 12 should be between two degrees and thirty degrees (20 and 30°) in order to permit the user of the bicycle seat 10 of the present invention to properly engage the pedals 76 and prevent the front face 17 of seat cushion 16 from interfering with the operation of the bicycle 70. However, one of the important features of the present invention is that the front face 17 is generally flat which provides the maximum amount of support for the legs of the user of the bicycle seat 10 of the present invention, thus substantially increasing his or her comfort level while still permitting proper operation of the bicycle 70. The forward tilt of seat base 12 combined with the generally flat front face 17 of seat cushion 16 provides this superior operational capability, and such a forwardly tilted generally flat front face seat cushion 16 is not shown in the prior art as being used with semi-recumbent and upright bicycles.

Additionally, it should be noted that the bicycle seat 10 of the present invention, including both the seat base 12 and the seat back 36, is mounted only to the main seat support tube 72 and is not connected to any other part of the bicycle frame, thus permitting the height of the bicycle seat 10 to be quickly and easily adjusted, a feature which is found on no other traditional or semi-recumbent bicycle currently being manufactured. This presents a substantial improvement over the prior art and thus is deserving of protection.

On a standard bicycle, the head tube (where the steering mechanism is mounted) generally has an angle of approximately seventy-four degrees (74°) and the fork extends downwards therefrom virtually parallel with it. This arrangement is ideal for stable steering and for speed since it causes the person to lean forward to reach the handlebars which decreases wind resistance.

For a more comfortable ride, though, the person needs to be sitting upright and, ideally, leaning into a backrest. This provides better visibility and eliminates stress on the wrists, neck, shoulders, and lower back. Furthermore, it also rotates the hips away from the seat horn which helps to reduce undesirable contact between the seat horn and the genitals of the rider. However, to accomplish this, the handlebars need to be extended and the head tube has to be rotated toward the rider. If the handlebars are merely extended, you create a tiller effect (like steering a boat) which is definitely not desirable on a bicycle. When you rotate the head tube toward the rider you also need to make allowances in the rake of the fork or the wheel will want to flop over at slower speeds and at different cornering angles.

In the present invention, as shown clearly in FIGS. 1 and 2, the head tube 77 on the bicycle frame 71 has been rotated to approximately sixty-five degrees (65°) and further the front fork 78 has been angled as shown to include a large rake 80 therein, the combined effect of which is to eliminate the tiller effect and flop to provide stable steering, and allow the rider to completely relax in the backrest. Such modifications are not shown in any semi-recumbent bicycles currently being manufactured and sold.

Additionally, the seat-to-pedal angle of the semi-recumbent bicycle 70 of the present invention is truly unique. In the prior art, the traditional diamond frame bicycle requires the use of a seat with a horn to keep the rider positioned on the seat. This is because the seat is at a steep angle (in excess of sixty-five degrees (65°)) to the pedals. Without this seat horn, the rider would not be able to sit on the seat and ride the bicycle as his or her legs could not extend downwards at the necessary angle. Taking this to the logical extreme, you would have a banana type seat which is virtually all horn. At the other end of the spectrum, however, are the recumbent bicycles. These bicycles have a very shallow angle from the seat to the pedals with many of them having pedals on the same plane as the seat. Some have pedals slightly higher and some slightly lower. This allows the rider to use seats with minimal or no horns and further permits the use of larger seats which are more comfortable. The downside to these designs is the seats sit very low to the ground which makes the bikes hard to see and also severely limits the rider's ability to visually detect oncoming hazards. Furthermore, the wheels must be moved apart to allow for the seat. It should also be noted that the extension of the wheelbase in this manner will greatly increase the turning radius and compromise the steering responsiveness of the bicycle because now the handlebars must be lengthened even more. All of these requirements degrade the performance of the bicycle, and therefore are undesirable.

The other option is to use small wheels and put the crank in front of the front wheel and then put the seat over the rear wheel. The disadvantage here is that the smaller wheels, in general, are not as stable over rough surfaces, curbs, or potholes. Smaller wheels also mean you have to add gearing to make the bike go as fast as one with larger tires.

The bicycle seat 10 of the present invention is supported at an optimal height to allow the rider's feet to reach the pedals and the ground. The seat is unique in that it is low enough to be ridden without a horn and yet it is high enough that the wheelbase does not have to be excessively lengthened. It also utilizes dual 26" wheels which are very desirable for comfort and performance. This is why the angle between the pedal axle 82 and the front face 17 of seat cushion 16 needs to fall between forty and fifty-five degrees (40° and 55°), which is only found in a semi-recumbent bicycle 70 such as disclosed by the present invention. If this angle is changed substantially, the bicycle 70 cannot be properly ridden and the rider is not able to sit on the bicycle seat 10. This narrow angle range between the seat and the pedals and the specific configuration of the front fork 78 include the large rake 80 result in the steering and seating benefits of the present invention which are unique in the world of semi-recumbent bicycles, and, in fact, in the entire world of bicycles.

Finally, it should be noted that seat cushion 16 is preferably generally free of any significant horns, pommels or other upward projections such as those generally found in the prior art, as it has been found that such horns can actually decrease the comfort level of some seats and further such horns are unnecessary for use with the seat cushion 16 of the present invention. It is preferred that the seat cushion 16 at most include only some contoured portions adapted to fit the buttocks of the individual using the bicycle seat 10 of the present invention, and further projections on the upper seating surface of the seat cushion 16 are deemed undesirable.

It is to be understood that numerous additions, modifications, and substitutions may be made to the bicycle seat 10 of the present invention which fall within the intended broad scope of the appended claims. For example, the size, shape, and construction materials used in connection with the bicycle seat 10 may be modified or changed so long as the functional characteristics of the invention are neither degraded nor destroyed. Furthermore, although the angles of the various elements of the bicycle seat have been described with some particularity, it is important to note that the ranges given for those elements are of critical importance and so long as the specific angle falls within those given ranges, the bicycle seat 10 of the present invention will function as intended. Also, the fact that the angle between the pedal axle 82 and the front face 17 of seat cushion 16 falls between forty and fifty-five degrees (40° and 55°) is vital to the functionality of the present invention. Finally, the key features of the adjustability of the seat back 36 relative to seat base 12 and the fact that the seat back 36 is mounted on seat back mounting shaft 24 which is directly connected to the seat base 12 are critical elements of the present invention, in that adjustment of the height of bicycle seat 10 by the seat base mounting shaft 18 being slid within main seat mounting tube 72 will simultaneously adjust the height of the seat back 36 relative to the bicycle 70 such that the relative positioning of the seat back 36 to seat base 12 remains the same. This arrangement is not found in the prior art, particularly in connection with semi-recumbent bicycles, and thus represents a substantial improvement over those bicycle seats found in the prior art.

There has therefore been shown and described an improved semi-recumbent bicycle 70 having an improved bicycle seat 10 which accomplishes at least all of its intended objectives.

I claim:

1. An improved semi-recumbent bicycle comprising:
a frame having a main seat support tube;
a steering mechanism rotatably mounted on said frame including a front tire support fork;
front and rear wheels, said front wheel rotatably mounted on said front tire support fork and said rear wheel rotatably mounted on said frame;
pedal means having a pedal axle rotatably mounted on said frame, said pedal means operatively connected to at least one of said front and rear wheels for powered rotation thereof;
a bicycle seat mounted above and forwards of said rear wheel, said bicycle seat including;
a bicycle seat frame;
a seat base mounted on said bicycle seat frame and having a seat cushion mounted thereon;

a seat back adjustably mounted on said bicycle seat frame for adjustment of the height of said generally upright seat back relative to said seat base and the distance said generally upright seat back is spaced from said seat base;
said seat cushion including a generally flat planar front face and a forwardly tilted top surface such that said front face is positioned lower than the rear portion of said seat cushion;
said top surface of said seat cushion being forwardly tilted from horizontal between two and thirty degrees (2° and 30°)
said front face of said seat cushion positioned above and rearwards of said pedal axle of said pedal means; and
said bicycle seat frame adjustably mounted on said main seat support tube free of any other support connection to said bicycle frame.

2. The improved semi-recumbent bicycle of claim 1 wherein said front face of said seat cushion and said pedal axle are positioned relative to one another such that the positional angle of the seat cushion above and behind said pedal axle is between forty degrees and fifty-five degrees (40° and 55°) from horizontal.

3. The improved semi-recumbent bicycle of claim 1 wherein the center portion of said seat cushion is free of upwardly projecting elements.

4. The improved semi-recumbent bicycle of claim 1 further comprising a seat base mounting collar mounted on a base plate operative to receive and mount to an end of said main seat support tube.

5. The improved semi-recumbent bicycle of claim 1 wherein said pedals on said semi-recumbent bicycle are positioned forward of and below said seat cushion on said bicycle seat on said semi-recumbent bicycle with the angle between said front face of said seat cushion and the rotational axis of said pedals being between forty and fifty-five degrees (40° and 55°) from horizontal.

6. The improved semi-recumbent bicycle of claim 1 further comprising a head tube mounted on said bicycle frame which rotatably supports said steering mechanism, said head tube extending upwards and rearwards on said bicycle frame at an angle of sixty-three to sixty-seven degrees (63° to 67°) from horizontal.

7. The improved semi-recumbent bicycle of claim 1 wherein said front fork comprises an forwardly angled lower rake portion extending at an angle greater than twenty degrees (20°) from parallel with the upper portion of said front fork whereby the tiller effect and flop are generally eliminated thereby providing significantly more stable steering.

8. An improved semi-recumbent bicycle comprising:
a frame having a main seat support tube;
a steering mechanism rotatably mounted on said frame including a front tire support fork;
front and rear wheels, said front wheel rotatably mounted on said front tire support fork and said rear wheel rotatably mounted on said frame;
pedal means having a pedal axle rotatably mounted on said frame, said pedal means operatively connected to at least one of said front and rear wheels for powered rotation thereof;
a bicycle seat mounted above and forwards of said rear wheel, said bicycle seat further comprising a bicycle seat frame, a seat base mounted on said bicycle seat frame, a seat cushion mounted on said seat base, the seat cushion including a generally flat front face and a forwardly tilted top surface generally free of upwardly projecting portions such that said front face is positioned lower than the rear portion of said seat cushion, said top surface of said seat cushion being forwardly tilted from horizontal between two and thirty degrees (2° and 30°);
a seat back adjustably mounted on said bicycle seat frame for adjustment of the height of said seat back relative to said seat base and for adjustment of the distance said seat back is spaced from the seat base;
said pedals on said semi-recumbent bicycle positioned forward of and below said seat cushion on said bicycle seat on said semi-recumbent bicycle with the angle between said front face of said seat cushion and the rotational axis of said pedal being between forty and fifty-five degrees (40° and 55°) from horizontal.

9. The improved semi-recumbent bicycle of claim 8 further comprising a seat base mounting collar mounted on base plate operative to receive and mount to an end of said main seat support tube.

10. The improved semi-recumbent bicycle of claim 8 further comprising a head tube mounted on said bicycle frame which rotatably supports said steering mechanism, said head tube extending upwards and rearwards on said bicycle frame at an angle of sixty-three to sixty-seven degrees (63° to 67°) from horizontal.

11. The improved semi-recumbent bicycle of claim 8 wherein said front fork comprises an forwardly angled lower rake portion extending at an angle greater than twenty degrees (20°) from parallel with the upper portion of said front fork whereby the tiller effect and flop are generally eliminated thereby providing significantly more stable steering.

* * * * *